A. C. CHENOWETH.
PROTECTIVE COVERING.
APPLICATION FILED SEPT. 29, 1910.
1,253,209.
Patented Jan. 15, 1918.
3 SHEETS—SHEET 2.
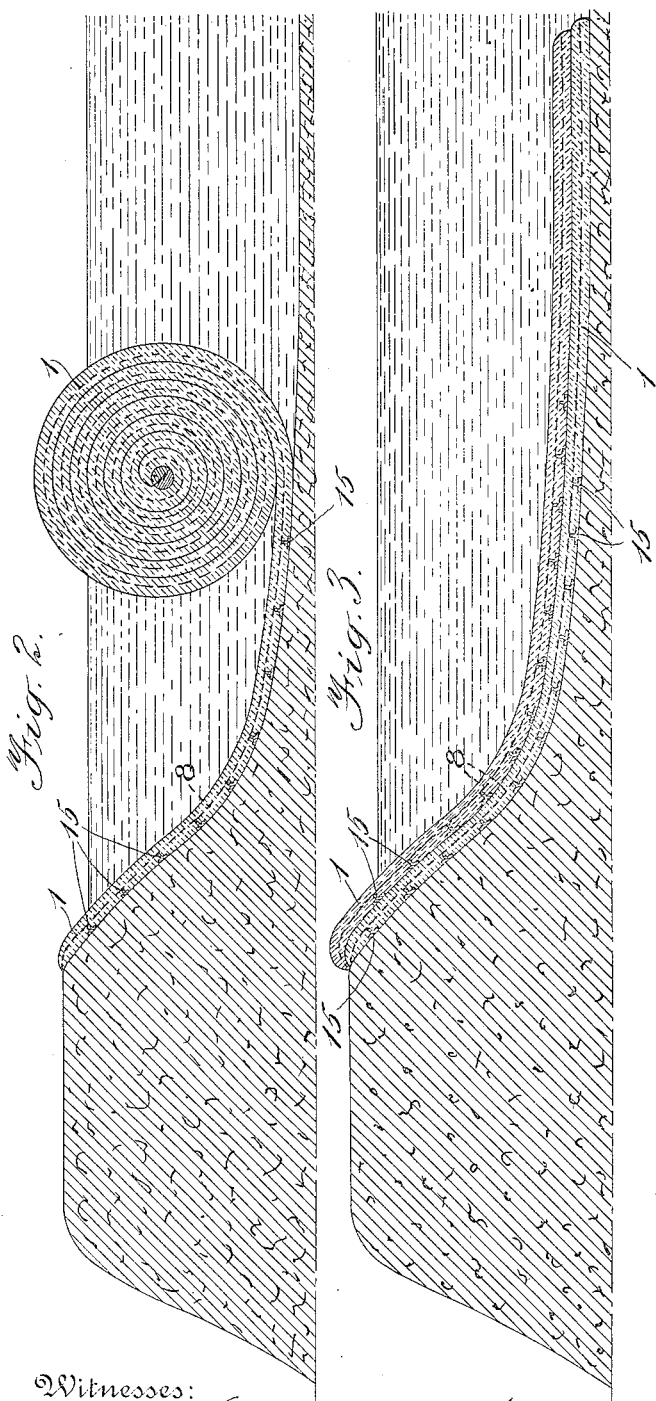
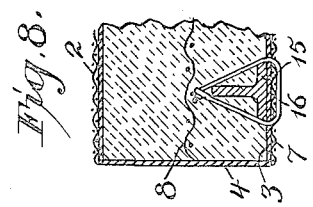
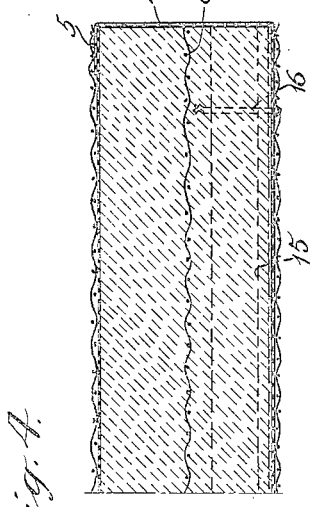
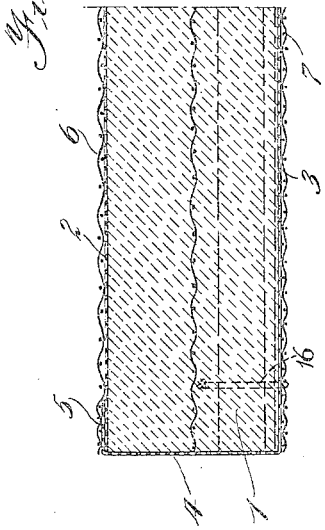

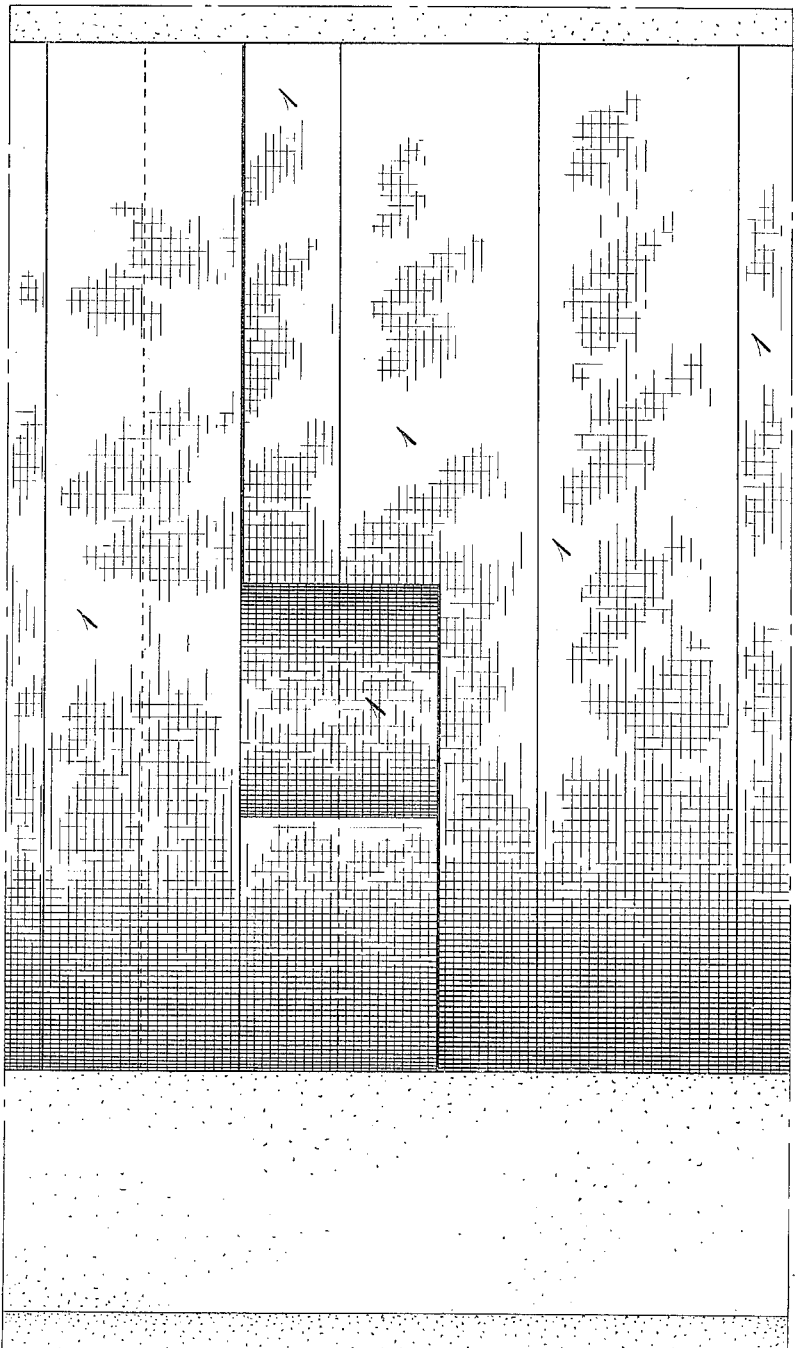

A. C. CHENOWETH.
PROTECTIVE COVERING.
APPLICATION FILED SEPT. 29, 1910.
1,253,209.
Patented Jan. 15, 1918.
3 SHEETS—SHEET 3.
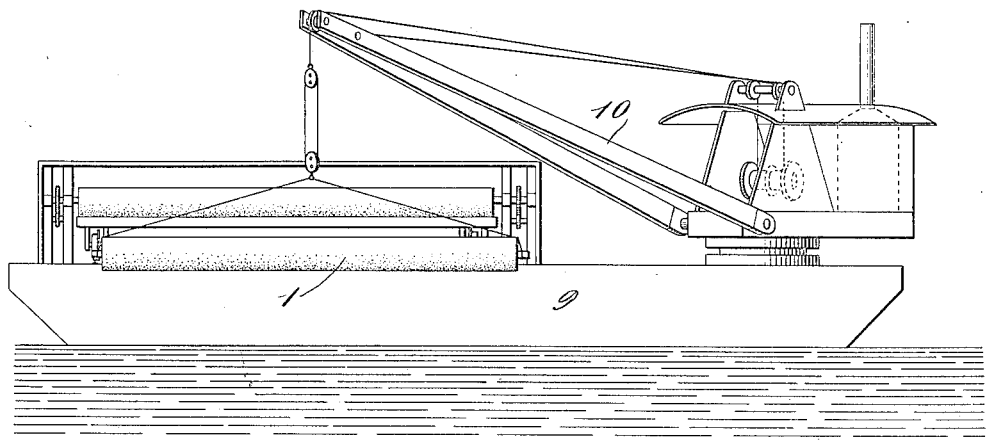
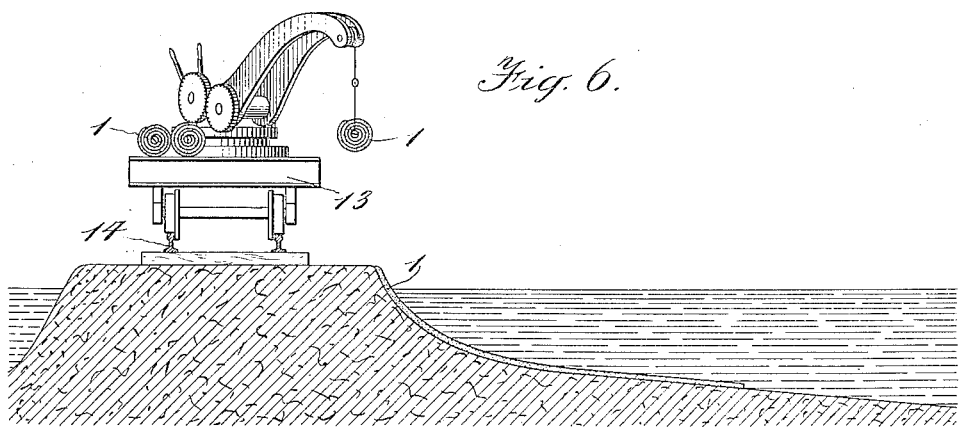
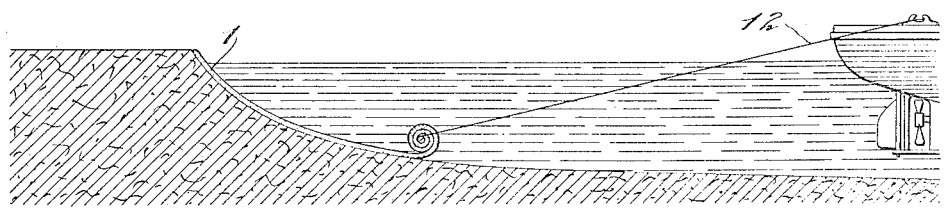

UNITED STATES PATENT OFFICE.

ALEXANDER CRAWFORD CHENOWETH, OF NEW YORK, N. Y., ASSIGNOR TO CHENOWETH CONCRETE REVETMENT COMPANY, INC., OF NEW YORK, N. Y., A CORPORATION OF NEW YORK.

PROTECTIVE COVERING.

1,253,209.

Specification of Letters Patent.   Patented Jan. 15, 1918.

Application filed September 29, 1910.   Serial No. 584,453.

*To all whom it may concern:*

Be it known that I, ALEXANDER CRAWFORD CHENOWETH, a citizen of the United States, and a resident of New York city, borough of Manhattan, in the county of New York and State of New York, have invented certain new and useful Improvements in Protective Coverings, of which the following is a specification.

My invention relates, broadly and generally, to new and useful improvements in protective coverings and more particularly to mattresses or protective coverings for protecting the banks of bodies of water from erosion.

While the particular object I have in view is that of protecting the banks of bodies of water, levees, dams and the like from erosion, I wish it understood that I do not desire to be limited to such particular application as the invention is capable of use in many situations where it is desired to apply a permanent protective coating or covering to a surface, and the claims appearing hereinafter are intended to be broad enough to cover all such applications or uses.

My invention consists in the coating or protective covering to be fully described hereinafter and the novelty of which will be particularly pointed out and distinctly claimed.

I have fully and clearly illustrated my invention in the accompanying drawings to be taken as a part of this specification and wherein—

Figure 1 is a plan view of a surface and the protective covering applied thereto showing one method of procedure for applying the same;

Fig. 2 is a sectional view showing the method of applying the protective covering to the bank of a body of water;

Fig. 3 is a sectional view showing the completed covering applied to the bank;

Fig. 4 is a transverse section through a sheet or body of the protective covering;

Figs. 5, 6 and 7 are details of means for locating and applying the protective covering in position;

Fig. 8 is an enlarged detail sectional view of sufficient of the mattress to show the manner of securing certain reinforcing members in position, said section being taken at right angles to the line of section of Fig. 4.

Before entering upon a detailed description of the invention I will state that one of its important objects is to provide a protective covering for the banks of rivers, and the like, which may be easily applied in position and which will set or harden so as to provide a permanent protective face to the bank of the river, the coating or covering to serve as a substitute for the many perishable forms of mattresses and protective coverings which have heretofore been used. In one method of accomplishing this object I form a flexible sheet, or body, of plastic or cementitious material which is capable of hardening and fold or roll the same into a substantially convolute roll which is applied in place preferably by fixing the outer edge portion of the sheet upon the surface to be protected, and then unrolling the roll across the face of said surface so that it may lie flat thereon or conform to the surface thereof, in which position it is permitted to harden or set and thereby form a permanent protective covering.

Referring now to the drawings by numerals of reference and particularly Figs. 1 to 4 inclusive, 1 designates a sheet of flexible plastic material, such as concrete or any other cementitious material which may be mixed in a moist state and which is capable of hardening. This sheet may be of any desired thickness and width and is protected upon its upper and lower surfaces by means of a fabric or protective cover 2, 3 of textile or any other suitable material, the lower cover 3 having its end portions carried up around the sides of the sheet of plastic material as at 4 and folded over the upper edge thereof as at 5, said ends being held down by means of a superimposed layer of flexible wire mesh fabric 6 which is laid down upon said end portions and across the face of the upper covering 2. The lower face of the sheet is also provided with a covering of flexible wire mesh 7 laid on the outside of the lower protective covering fabric 3. The purpose of the fabric cover is to protect the sheet of plastic material so that when the same is located beneath a body of water, as shown in Figs. 2 and 3, the water will be prevented from washing away the plastic material before the latter has time to set. The fabric cover also assists in retaining the sheet form of the cementitious sheet while the latter is being transported and applied in position on the surface to be protected. The outer coverings of wire mesh protect the fabrics 2 and 3 and prevent their becoming torn or otherwise displaced or destroyed.

The sheet is reinforced by suitable reinforcing means such, for instance, as a sheet of wire mesh fabric 8, extending longitudinally thereof, preferably at a point approximately midway between the upper and lower surfaces of said sheet. This reinforcing mesh or fabric is preferably located in a plane substantially parallel with the upper and lower faces of the sheet. This plastic sheet may be rolled into substantial convolute form such, for example, as shown clearly in Fig. 2, any suitable means being employed for this purpose such, for instance, as the machines forming the subject-matter of my U. S. Patent 797,556 or, as disclosed in my pending applications Serial Nos. 434,061, 407,276 and 573,374. By the machines shown in said patent and applications the sheet is simultaneously formed and rolled in the convolute form, but I desire it understood that such operation is not necessary in this instance as the sheet might first be formed and then rolled into convolute form by any suitable rolling means. The sheet having been formed and rolled in the form substantially as shown in Fig. 2, the roll is conveyed, while the material is still in an unset state, to the situation where it is to be applied, and the outer edge thereof is secured or placed upon one edge portion of the surface to be protected and the roll is then unrolled across the face of said surface in a manner which it is believed will be clearly understood from an examination of Figs. 2, 3 and 7. Where the sheet is being applied to an inclined surface, such, for instance, as the bank of a stream, the weight of the roll may be sufficient to cause the same to gravitate down the face of the inclined face and thus unroll without the use of any means for unrolling the same, but in Figs. 5 and 7 I have shown means by which it may be unrolled mechanically. In Fig. 5 is shown a barge 9 upon which is supported a rotary crane 10 with means for supporting the mandrel upon which the roll is formed, whereby it may pull upon the mandrel so as to unroll the sheet, this means consisting of suitable tackle and rope connections supported from the crane.

In Fig. 7 means is shown for accomplishing the same result which consists of a self-propelling boat, such as a tug, which by a line connection 12 to the mandrel, may pull the rope down so as to unroll the sheet across the surface to be protected.

In Fig. 6 is shown an apparatus for applying the sheet, the same consisting of a truck 13 traveling on a trackway 14, and carrying a crane to support the roll, the crane being rotatable so that it may be adjusted to properly position the roll upon the surface to which the sheet is to be applied. All of these mechanical contrivances just described for applying the sheet are merely by way of example, and in no way limit my invention.

In applying the protective covering to an extended surface, as, for instance, the bank of a river, a number of the sheets are employed, the same being arranged side by side preferably but not necessarily in two layers, the sheets of the first layer being laid as shown in Fig. 1 with the side edges as closely adjacent as possible, and the sheets of the upper layer laid upon the upper face of the lower layer, but so arranged that the sheets thereof overlap the joints between the sheets of the lower layer, so that said joints are closed and the water of the river or stream is prevented from access to the bank through the joints between the lower layers.

In order to prevent the unset mass from sliding down the face of an inclined surface before said mass has time to harden, I may provide a plurality of transverse, flanged bars 15 as shown in Figs. 2 and 3, which are secured to the lower wiremesh of the covering and project within the body of the plastic material, and serve to prevent any tendency of the same to slide down the inclined surface. The members 15 may be secured in parallel relation in any suitable manner; for instance, by tie-wires 16 passing through the lower outer wire mesh 7 and twisted together at their ends so as to inclose said members, as shown in Figs. 4 and 8. These bars or retaining devices may be made to extend throughout the entire length, or be arranged only within that part on the inclined surface, as shown in Figs. 2 and 3.

From the above description taken in connection with the drawings it will be seen that I provide a flexible, monolithic plastic covering which is adapted to substantially conform to the surface to which it is applied, and to harden thereon, so that said surface is provided with a hard and permanent protective covering. It will be understood that where the protective covering is to be applied under water that it will be formed of some substance, for instance, hydraulic cement, which is capable of hardening in the presence of water.

I desire it understood that I do not limit myself to a construction of the protective covering in which the material is in a plastic state when it is applied to the bank of the body of water, as it may be composed of material not plastic, but which will harden when subjected to water after being applied in position.

Having thus described my invention, what

I claim as new and desire to secure by Letters Patent is:—

1. A covering for the purpose set forth comprising a flexible monolithic sheet of plastic material capable of hardening under water and having flexible metal fabric reinforcing means located in the body thereof in a plane substantially parallel with the upper and lower faces of the said sheet, said covering having a flexible protective cover on its lower face, said covering being adapted to be transported and applied in unset condition on a surface and by virtue of its flexibility harden on said surface in substantial conformation thereto.

2. A covering for the purpose set forth comprising a flexible monolithic sheet of plastic material capable of being transported and applied in unset condition and hardening under water and having a sheet of flexible reinforcing metal fabric therein located in the body of the covering in a plane between the upper and lower surfaces thereof, and transverse members embedded therein to maintain said plastic material in its predetermined form and thickness.

3. A covering for protecting bodies from erosion, comprising upper and lower fabric covers, a filling of unset cementitious material between said covers, and edge facings joining the edges of the upper and lower covers and confining the cementitious material.

4. A covering for the purpose set forth comprising a flexible sheet of plastic material capable of hardening under water, and having metallic reinforcing means therein, and spaced metallic bars extending transversely of the covering to hold said plastic material in position.

5. A covering for the purpose set forth comprising a flexible sheet of plastic material capable of hardening under water, and having metallic reinforcing means therein and transverse flanged metallic bars projecting into the said material to hold said material in position.

6. A covering for the purpose set forth comprising a flexible sheet of plastic material capable of hardening under water, and having reinforcing means therein and transverse bars embedded in the material and extending transversely thereof.

In testimony whereof I have signed my name to this specification in the presence of two subscribing witnesses.

ALEXANDER CRAWFORD CHENOWETH.

Witnesses:
C. G. HEGLMEN,
M. E. McNINCH.